United States Patent [19]

Roggero et al.

[11] Patent Number: 5,334,695
[45] Date of Patent: Aug. 2, 1994

[54] THERMOTROPIC COPOLYESTER, PROCESS FOR PREPARING IT AND USE THEREOF IN THE PREPARATION OF VULCANIZED RUBBERS

[75] Inventors: Arnaldo Roggero, San Donato Milanese; Ugo Pedretti, Milan; Francesco P. La Mantia, Palermo; Vincenzo Citta', Castel Buono; Alessandro Lezzi, Milan, all of Italy

[73] Assignee: Eniricherche S.p.A., Milan, Italy

[21] Appl. No.: 918,548

[22] Filed: Jul. 22, 1992

[30] Foreign Application Priority Data

Jul. 30, 1991 [IT] Italy .................. MI91A002107

[51] Int. Cl.$^5$ .................. C08G 63/00; C08G 63/02
[52] U.S. Cl. .................. 528/193; 528/176; 528/190; 528/272
[58] Field of Search .................. 528/176, 193, 272, 190

[56] References Cited

U.S. PATENT DOCUMENTS

| 4,626,584 | 12/1986 | Stackman et al. | 528/192 |
| 4,963,642 | 10/1990 | Roggero et al. | 528/193 |
| 5,086,160 | 2/1992 | Pedretti et al. | 528/193 |

FOREIGN PATENT DOCUMENTS

| 554222 | 2/1957 | Belgium . |
| 0347963 | 12/1989 | European Pat. Off. . |
| 0364388 | 4/1990 | European Pat. Off. . |
| 0383177A2 | 8/1990 | European Pat. Off. . |

OTHER PUBLICATIONS

Journal of Polymer, 1983, Thermotropic Homopolyesters. I. The Preparation and Properties of Polymers Based on 4,4'-Dihydroxybiphenyl, J. Asrar, et al.
Macromolecules, 1983, Thermotropic Polyesters. 2. Investigation of the Mesophase Properties of Polymers Based on 4,4'-Dihydroxybiphenyl W. R. Krigbaum, et al.

*Primary Examiner*—John Kight, III
*Assistant Examiner*—T. Mosley
*Attorney, Agent, or Firm*—Rogers & Wells

[57] ABSTRACT

A thermotropic copolyester, which displays a liquid-crystal phase of nematic type, within a desired temperature range, contains units deriving from:
- (a) a saturated, aliphatic dicarboxy acid;
- (b) 4,4'-dihydroxy-biphenyl and/or mono- or di-alkyl- or -alkenyl-derivatives thereof;
- (c) 4-hydroxy-benzoic acid and/or alkyl- or alkenyl-derivatives thereof.

Such a copolyester improves the processability of unsaturation-containing elastomers and enhances the mechanical properties of subsequently vulcanized products.

12 Claims, No Drawings

THERMOTROPIC COPOLYESTER, PROCESS FOR PREPARING IT AND USE THEREOF IN THE PREPARATION OF VULCANIZED RUBBERS

The present invention relates to a thermotropic liquid-crystal copolyester containing unsaturations in its side chains, and to the process for preparing it. The invention relates also to the use of said copolyester in the preparation of vulcanized rubbers.

In the art, particular macromolecular compounds are known, which display a thermotropic behaviour, turning, at lower temperatures than their thermal breakdown temperature, into liquid phases characterized by a high Level of structural order. Thanks to this feature, such polymers yield, through extrusion or injection processes, finished items endowed with high mechanical properties. Furthermore, owing to the very low viscosity values of their molten phases, such compounds are suitable for use in order to prepare fibres with a very high orientation degree, or finished articles with a very complex geometry. Most polymeric compounds belonging to this class of substances show the chemical structure of fully aromatic polyesters.

In the art, also liquid-crystal polyesters are known, which contain rigid units (aromatic units) in their macromolecule, alternating with flexible units (aliphatic units), such as, e.g., those described by Krigbaum and co-workers in *J. Polymer Sci., Polym. Phys. Ed.*, 21, 1119 (1983) and in *Macromolecules*, 16, 1271 (1983).

in European Patent Appln. public. No. 0 347 963 of Dec. 27, 1989 a class of liquid-crystal copolyesters is disclosed, which contain units derived from either halo- or alkyl-substituted hydroxybenzoic acid, a saturated aliphatic dicarboxy acid and 4,4'-dihydroxy-biphenyl. Such copolyesters display a mesophase of nematic type, within a wide range of temperatures, also including those temperatures at which a large number of traditional thermoplastic polymers are processed, such as nylon, poly-(ethylene terephthalate, poly-(butylene terephthalate), polycarbonate, and so forth. In such a way, said compounds are suitable for use as self-reinforced materials, or as reinforcer agents for the traditional polymers cited hereinabove.

Finally, European patent application No. 0 364 388 discloses the use of thermotropic liquid crystal polymers, in the preparation of blends with rubbery matrix. The addition of liquid-crystal polymers (LCP) to elastomeric materials makes it possible the usual inorganic fillers, such as, e.g., carbon black (CB), to be added without endangering the processability characteristics of the blends. Furthermore, the mechanical properties of the blends are synergistically improved due to the effect of simultaneous addition of LCP and CB.

However, the problem of adhesion of LOP to the rubbery matrix still remains unovercome: solving this problem would enable the typical mechanical properties of liquid-crystal polymers to be transferred to the same matrix.

A novel class of thermotropic liquid-crystal polymers was found now, which are provided with side-chain unsaturations, so as to allow vulcanized rubbers displaying particularly high mechanical properties to be obtained.

In accordance therewith, the present invention relates to a thermotropic copolyester which originates, within a temperature range of from 100° C. to 250° C., a mesophase of nematic type containing, in its molecule, units deriving from:

(a) at least one saturated, aliphatic, alpha,omega-dicarboxy acid:

wherein n is comprised within the range of from 3 to 8;

(b) at least one 4,4'-dihydroxy-biphenyl, having the general formula (I):

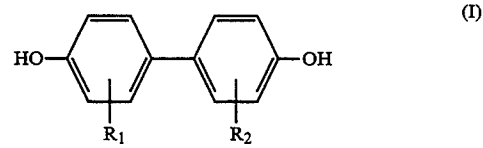

(c) at Least one 4-hydroxy-benzoic acid having the general formula (II):

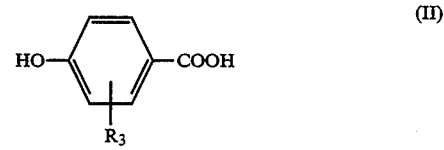

wherein $R_1$, $R_2$, $R_3$, which may be the same, or different from one another, are hydrogen ($C_1$–$C_6$)-alkyl or ($C_3$–$C_6$)-alkenyl, with the proviso that at least one from said three substituents is an alkenyl;

with the following mutual molar ratios between the units:

(a)/(b)=1;

(c)/(a) comprised within the range of from 1 to 7, with the proviso that, if $R_3$=H, the ratio of (c)/(a) is lower than, or equal to, 2.

Preferably, in the copolyester according to the present invention, the mutual molar ratios between the units are:

(a)/(b)=1;

(c)/(a) comprised within the range of from 2 to 6.

Among saturated aliphatic alpha,omega-dicarboxy acids the most commonly used ones are sebacic acid, suberic acid and adipic acid. Of all of them, sebacic acid is most preferred.

In the preferred form of practical embodiment, $R_1$, $R_2$ and $R_3$ substituents are, independently, hydrogen, methyl, propyl, allyl.

According to a still more preferred from of practical embodiment, $R_1$ and $R_2$ substituents are hydrogen, and $R_3$ is allyl, or allyl and propyl.

The copolyester according to the present invention can be obtained—and this is a further aspect of the present invention—by means of a condensation reaction, carried out in the molten phase, between (a) a saturated aliphatic dicarboxy acid, (b) a diacyl-derivative of 4,4'-di-hydroxy-biphenyl and (c) an acyl-derivative of 4-hydroxy-benzoic acid, at temperatures increasing from about 190° C., up to a maximal value of about 320° C. and under pressures decreasing down to an end value of about $10^{-4}$ mm$_{Hg}$.

The reaction of copolymerization can be indifferently carried out both by starting from the acylated derivatives of the hydroxy-containing (b) and (c) reactants, and by starting from said compounds in their hydroxy form, with the addition of an excess of acyl anhydride.

The reaction can be catalysed by various derivatives of alkali metals or alkaline-earth metals, such as sodium, potassium, calcium, magnesium and zinc carboxylates, the oxides of said metals, or the oxides of other metals, such as titanium, antimony and tin. Preferably, for that purpose, sodium acetate is used, in an amount comprised within the range of from 0.01 to 1 parts per 100 parts by weight based on monomers submitted to copolymerization, In the copolymerization process indicated hereinabove, the acylated derivatives of (b) and (c) reactants are prepared first, by reaction with the selected acyl anhydride. The preferred 4,4'-diacyloxy-biphenyl, which may be either substituted or not, is ($R_1$–$R_2$)-substituted 4,4'-diacetoxy-biphenyl, which can be obtained by reacting a 4,4'-dihydroxybiphenyl having general formula (I), with acetic anhydride. The preferred (either substituted or non-substituted) 4-acyloxybenzoic acid is (either substituted or non-substituted) 4-acetoxybenzoic acid, which can be obtained by reacting (either substituted or non-substituted) 4-hydroxybenzoic acid of general formula (II) with acetic anhydride. Some substituted 4-hydroxybenzoic acids are available from the market. Other of them, such as methyl-substituted, or n-propyl-substituted, or allyl-substituted 4-hydroxy-benzoic acid, can be prepared by following the normal techniques of organic chemistry.

The copolymerization is carried out by mixing, inside a reaction vessel, the desired proportions of at least one alpha,omega-dicarboxy acid, at least one 4,4'-diacetoxybiphenyl deriving from a 4,4'-dihydroxy-biphenyl of general formula (I), at least one 4-acetoxybenzoic acid deriving from 4-hydroxy-benzoic acid of general formula (II). The catalyst is added, and the mixture is heated under a dry nitrogen mixture, until said mixture melts.

The progressive increase in temperature causes the development of acetic acid, which is released owing to the condensation reaction. During the end steps of the reaction, owing to an increase in mixture viscosity, the development of acetic acid can be accelerated by means of a progressive decrease in reaction vessel pressure.

Before starting this step of reduced-pressure polymerization, a free-radical scavenger (hindered phenols, hindered amines, aryl-phosphites, and so forth) is suitably added in order to prevent cross-linking reactions from occurring.

In that way, a progressive increase is obtained in the molecular weight of the resulting copolyester, which takes place with small amounts of other low-molecular-weight byproducts being released in addition to acetic acid. The copolymerization is halted by discontinuing heating when the material reaches the desired viscosity. Normally, the highest temperature reached during the copolymerization is of the order of 250° C., and the required times for copolymerization may vary within the range of from 3 to 10 hours, and preferably are of the order of 5 to 7 hours.

In the second copolymerization process mentioned hereinabove, the desired proportions of alpha,omega-dicarboxy acid, either substituted or non-substituted 4,4'-dihydroxybiphenyl of general formula (I), either substituted or non-substituted 4-hydroxybenzoic acid of general formula (II), are charged to the reactor. To the resulting mixture, the catalyst, and an amount of acetic anhydride slightly in excess over the stoichiometric amount required by the acetylation reaction of all of the hydroxy groups contained in the reactants, are added. The reaction mixture is then gradually heated, until the complete dissolution is obtained, is and the process continued by copolymerizing under such conditions as disclosed hereinabove.

The copolyesters according to the present invention display crystal/mesophase transition temperatures comprised within the range of from about 100° C. to about 250° C., preferably of from about 120° C. to about 200° C.

The intrinsic viscosity of the copolyesters produced according to the processes of the present invention is comprised within the range of from 0.4 to 1.5 dl/g, as measured at 60° C., solution in pentafluorophenol, at the concentration of 0.1 g/dl.

The characterization of the structure of the copolyesters produced was carried out by X-ray diffractometry on powder samples, using Cu K-alpha radiation, with a Siemens diffractometer D.500 equipped with a regulatable temperature cell.

The characterization of the copolyesters for their thermal characteristics, carried out by the techniques of differential calorimetry and thermo-optical analysis, shows the presence of a $1^{st}$-order transition, corresponding to the transition from the crystal state to the nematic state.

The copolyesters disclosed herinabove display, at higher temperatures than the melting temperature of their crystal phase, a nematic mesophase, which is stable up to higher temperatures than 300° C.

The copolyesters can be submitted to thermal treatments of annealing at temperatures slightly under their crystal → mesophase transition temperature, and under preferably reduced pressures, The most commonly used conditions are temperatures comprised within the range of from 100° C. to 200° C. and pressures comprised within the range of from 760 to $10^{-3}$ $mm_{Hg}$, under an inert, anhydrous atmosphere, and treatment times of up to 100 hours. Following such a thermal treatment as specified hereinabove, a gradual increase in molecular weight is normally observed, as shown by the increase in intrinsic viscosity, as measured in pentafluorophenol at 60° C. and at a concentration of 0.1 g/dl.

The resulting liquid-crystal polymer—and this is a further aspect of the present invention—improves the processability of any kinds of elastomeric rubbers, and the mechanical properties of the same rubbery composition, after vulcanization. The elastomer, or mixture of elastomers, used according to the present invention, contains monomers belonging to the class of conjugated dienes and to the class of non-conjugated dienes, of from 4 to 12 carbon atoms, preferably of from 4 to 8 carbon atoms. Typical examples of conjugated dienes are 1,3-butadiene, isoprene, 2,3-dimethyl-1,3-butadiene, 2-methyl-1,3-butadiene, 2-methyl-1,3-pentadiene, 3,4-dimethyl-hexadiene, and the like. The elastomeric composition may also contain various amounts of vinyl-aromatic monomers such as styrene, 1-vinyl-naphthalene, 2-vinyl-naphthalene, alpha-methyl-styrene, and the like. Elastomers which may advantageously be used in the instant invention comprise polybutadiene, styrene-butadiene rubber (SBR), synthetic polyisoprene, natural rubber, isoprene-butadiene rubber, nitrile rubbers and EPDM rubbers.

The blends according to the present invention are prepared by mixing, in the molten state, the thermotropic liquid-crystal polymer of the present invention (LCPR) with the elastomeric phase. Said mixing can be carried out by means of different mixing techniques, preferably using sealed blenders.

The liquid crystals according to the present invention can be blended with the traditional elastomeric polymers, by the normal techniques, at the processing temperatures usually employed for said elastomeric polymers, in order to yield materials containing different percentages of the liquid crystal polymer. The latter is contained in the rubber in an amount comprised within the range of from 2 to 50, preferably of from 5 to 40, parts per 100 parts of rubber.

The liquid-crystal polymer can be added to the rubber both before, and after, the addition of the usual fillers, generally constituted by carbon black, and other possible fillers, The addition of these fillers increases the viscosity of the blend. However, the liquid-crystal polymer makes it possible a good processability to be achieved also in the presence of these additives.

In order to prepare the vulcanized rubber, it is necessary that the rubbery composition contains sulfur and/or sulfur-containing compounds. Hence, the rubbery composition according to the present invention will also contain, besides LCPR and possible fillers, elemental sulfur and/or sulfur-containing compounds, well-known to those skilled in the art, which are capable of releasing sulfur during the vulcanization step. In general, the rubbery composition will contain from 0.2 to 8 parts of sulfur, or sulfur-containing substances, per 100 parts of rubber, preferably of from 0.5 to 4, and still more preferably, from 1 to 2.5 parts per 100 parts of rubber. Generally, the rubbery composition will also contain a primary accelerator in an amount comprised within the range of from 0.1 to 2.5 parts, preferably of from 0.2 to 1.5, parts per 100 parts of rubber. Some meaningful, non-limitative, examples of these primary accelerators include benzothiazoles, such as benzothiazyl disulfide and 2-mercapto-benzothiazoles, sulfenamides, dithiocarbamates, thiurams, thioureas.

The rubbery composition may comprise secondary accelerators as well, in an amount comprised within the range of from 0.2 to 0.8 parts, preferably from 0.05 to 0.5 parts, per 100 parts of rubber.

The rubbery composition of the present invention may additionally contain other additives, such as carbon black, decay-preventing agents, oils and waxes in amounts well-known to those skilled in the art.

The following experimental examples are reported in order to better illustrate the invention.

EXAMPLE 1

The following reactants:
sebacic acid: 222.2 g (1.1 mol)
4,4'-dihydroxybiphenyl: 204.6 g (1.1 mol)
4-hydroxy-3-allylbenzoic acid: 391.6 g (2.2 mol)
4-hydroxybenzoic acid: 303.6 g (2.2 mol)
sodium acetate: 250 mg are charged to a glass reaction vessel of 5 liters of capacity, equipped with a teflon-coated stainless steel stirrer, inlet for monomer addition, nitrogen inlet fitting, reflux condenser and a Claisen fitting.

After evacuating the reaction vessel, dry nitrogen is introduced into it. This cycle is repeated a plurality of times. Then, previously degassed acetic anhydride is charged (744.6 g, corresponding to 7.3 mol) and the reaction vessel is subsequently heated with an oil bath until acetic anhydride starts refluxing. The reaction system is kept under acetic anhydride refluxing conditions for 5 hours.

The excess of acetic anhydride, and most acetic acid formed during the acetylation step are subsequently distilled off and the residual, hot solution is transferred, by siphon, into a stainless-steel autoclave of 3 liters of capacity, equipped with a vapour condensation and collection system, with a bottom drain suitable for extruding a molten polymer and with a fitting for connection with a vacuum-nitrogen line.

The autoclave is completely managed by a computer which is programmed with the following temperature profile:

heating up to 200° C. over 0.5 hours; the distillation of acetic acid formed during the preceding acetylation step continues;

the temperature is kept constant at 200° C. for 5 hours; the acetylation step is concluded and the reaction of polycondensation begins;

the temperature is increased up to 230° C. over 1 hour; with this temperature increase, the operating steps under room pressure are concluded and the equipment is now ready to perform the low-pressure operations;

the temperature is kept constant at 230° C. for 2 hours and the pressure is simultaneously progressively reduced; the polycondensation is terminated when a preset torque value is reached.

Before starting the polymerization step under reduced pressure, it is suitable that to the molten, reacting mass, a free-radical scavenger (hindered phenols, hindered amines, aryl-phosphites, and so forth) is suitably added in order to prevent cross-linking reactions from occurring.

The autoclave is eventually pressurized with nitrogen at 5 atm, and the molten polymer is extruded through the bottom drain. The noodle is chopped by means of a shearing unit, and the thusly recovered polymer, now in the form of chips, is vacuum dried at temperature of 100° C., for several hours , The copolyester shows an intrinsic viscosity of 0.8 dl/g, as measured in pentafluorophenol at 60° C., at the concentration of 0.1 g/dl, and with a temperature of transition into the nematic mesophase of approximately 120° C.

COMPARATIVE EXAMPLE

By means of the procedure already disclosed in Example I, but without the addition of free-radical scavenger, the unsaturation-free LCPA is prepared, which is reported, for comparative purposes, in the following tables, by starting from the following reactants:
sebacic acid: 222.2 g (1.1 mol)
4,4'-dihydroxybiphenyl: 204.6 (1.1 mol)
4-hydroxy-3-propylbenzoic acid: 396.0 (2.2 mol)
4-hydroxybenzoic acid: 303.6 (2.2 mol)
acetic anhydride: 744.6 g (7.3 mol)
sodium acetate: 250 mg The resulting copolyester displays an intrinsic viscosity value of 0.8 dl/g and a temperature of transition into mesophase of approximately 120° C.

EXAMPLE 2

By means of the procedure disclosed in Example I , the following reactants are charged to the reactor:
sebacic acid: 444.4 g (2.2 mol)

4,4'-dihydroxybiphenyl: 409.2 g (2.2 mol)
4-hydroxy-3-allylbenzoic acid: 195.8 g (1.1 mol)
4-hydroxy-3-propyl-benzoic acid: 198.0 g (1.1 mol)
4-hydroxybenzoic acid: 303.6 g (2.2 mol)
acetic anhydride: 993.0 g (9.7 mol)
sodium acetate: 250 mg By operating according to the above modalities, a copolyester is obtained, which displays an intrinsic viscosity of 0.7 dl/g and a temperature of transition into mesophase of approximately 125° C.

EXAMPLE 3

By following the modalities set forth in Example 1, the following monomers are charged to the reactor:
sebacic acid: 444.4 g (2.2 mol)
4,4'-dihydroxybiphenyl: 204.6 g (1.1 mol)
4,4'-dihydroxy-3,3'-diallylbiphenyl: 292.6 g (1.1 mol)
4-hydroxybenzoic acid: 607.2 g (4.4 mol)
acetic anhydride: 993.0 g (9.7 mol)
sodium acetate: 250 mg The polycondensation is carried out according to the program disclosed in Example 1; the thusly obtained polymer displays an intrinsic viscosity of 0.9 dl/g and a temperature of transition into nematic mesophase of approximately 130° C.

EXAMPLE 4–6

In this set of examples, the preparations are reported of blends which contain natural rubber (NR) and the liquid-crystal polymer disclosed in Example 1 (LCPR).

The blending was carried out on a Brabender apparatus equipped with a blending chamber.

The liquid crystal polymer was finely ground at liquid nitrogen temperature in a Pulverisette mill, and then the resulting powder was added to the elastomer in the amounts displayed in the following, by operating at the temperature of 130° C., over 30 minutes, with the rotors revolving at 77 rpm.

TABLE I

| Example | Phr of LCPR* | Torque** |
|---------|--------------|----------|
| 4 | 0 | 16 |
| 5 | 10 | 12 |
| 6 | 20 | 10 |

*Phr: parts per 100 parts.
**as N.m

From an analysis of Table I, it clearly appears that the addition of LCPR to the elastomeric matrix reduces the viscosity of the molten material during the processing step.

EXAMPLE 7–9

In this set of experiments, the preparations are reported of blends which contain EPDM rubber and the liquid-crystal polymer disclosed in Example 1 (LCPR).

The blending was carried out on the same Brabender apparatus as described in Examples 4–6.

The liquid crystal polymer was finely ground at liquid nitrogen temperature in a Pulverisette mill, and the resulting powder was then added to the elastomer, in the amounts displayed in the following, by operating at the temperature of 160° C., over 10 minutes, with the rotors revolving at 77 rpm.

TABLE II

| Example | Phr of LCPR* | Torque** |
|---------|--------------|----------|
| 7 | 0 | 25 |
| 8 | 10 | 20 |

TABLE II-continued

| Example | Phr of LCPR* | Torque** |
|---------|--------------|----------|
| 9 | 20 | 17 |

*Phr: parts per 100 parts.
**as N.m

Also in this case, the data reported in Table II clearly demonstrate that the addition of LCPR to the elastomeric matrix reduces the viscosity of the molten material during the processing step.

EXAMPLES 10–14

In this set of experiments, natural rubber (NR) was admixed with liquid-crystal polymers, with the vulcanization agents described ASTM Standard D 3184 and/or carbon black (CB).

The liquid-crystal polymers used are those disclosed in Example 1 (LCPR) and in Comparative Example (LCPA).

All samples reported were prepared on the Brabender apparatus described in Examples 4–6, under the following conditions:
blending temperature: 130° C.
blending time: 30 minutes
rotors revolution speed: 77 rpm After blending, all blends were vulcanized between two parallel plates, at a temperature of approximately 150° C., inside a mould of 10 cm×10 cm×2 mm of size, under a pressure of about 4 MPa, for a time of 40 minutes. Specimens were produced, which were of 5 mm×2 mm×2 mm of size, and were submitted to dynamic-mechanical tests under shear stress, by means of the instrument Rheometrics RSA2 Solid Analyzer, at the temperature of 25° C., frequency of 6.28 radians.sec$^l$ and variable strain magnitude (strain sweep).

The elastic modulus was then measured as a function of the strain. This quantity can be used as a measurement of the reinforcement of the material. The values of elastic modulus reported Tables III and IV relate to a strain of 0.1%.

TABLE III

| Example | Sample | G' |
|---------|--------|-----|
| 10 | Reference | 0.57 |
| 11 | 20 phr of LCPR | 5.2 |
| 12 | 20 phr of CB | 3.1 |
| 13 | 20 phr of LCPA/20 phr of CB | 8.5 |
| 14 | 20 phr of LCPR/20 phr of CB | 20.3 |

G' = elastic modulus (MPa)

The reference sample is constituted by natural rubber, vulcanized under such conditions as reported hereinabove. The analysis of the data reported in Table III clearly evidences that the reinforcer action performed by the liquid crystal polymer containing side allyl moieties (LCPR) is decidedly higher than as supplied by both CB (Examples 11 and 12) and the analogous LCP, containing an alkyl chain (Examples and 14).

Furthermore, the synergism displayed by LCP and CB—already claimed in European patent EP 0 364 388 A1—is evident.

EXAMPLES 15–19

In this set of experiments, tests are reported, which are analogous to those disclosed in Examples 10–14, in which EPDM replaces natural rubber.

EPDM blends were prepared on the Brabender blender, with a mixing speed of 77 rpm, according to the same procedure, and under the same conditions as of ASTM Standard D 3568, Formulation 1.

in a first blending step, EPDM, LCPR, zinc oxide, carbon black and stearic acid are mixed at the temperature of 150° C., rotors revolution speed 77 rpm, for 5 minutes.

The blend is discharged from the Brabender blender, and is charged to a press at about 50° C., inside a mould of 2 mm of thickness, and the temperature is reduced down to room temperature. The resulting sheet cut into small pieces, which are charged again to the mixer, together with the vulcanizing system (TMTD, MBT and sulfur) at 40° C. and at the mixing speed of 77 rpm. The temperature is then increased up to 110° C. during an approximate time of 90 seconds, and the blend is mixed for 2 minutes. The blend is recovered and is vulcanized at the temperature of 160° C. for 15 minutes, during which the mould is kept under a pressure of 4 MPa. The mould is cooled down and the measurements reported in Table IV are performed.

TABLE IV

| Example | Sample | G' |
|---------|--------|-----|
| 15 | Reference | 1.8 |
| 16 | 20 phr of LCPR | 5.5 |
| 17 | 40 phr of CB | 3.4 |
| 18 | 20 phr of LCPA/40 phr of CB | 9.9 |
| 19 | 20 phr of LCPR/40 phr of CB | 21.9 |

G' = elastic modulus (MPa)

Also in this set of experiments, the same trend is evident, which was observed in the case of natural rubber.

We claim:

1. A thermotropic copolyester which has a mesophase nematic transition temperature range of from 120° C. to 200° C., consisting essentially of, in its macromolecule, units derived from:

(a) at least one saturated, aliphatic alpha, omega-dicarboxy acid having the general formula I $$HOOC-(CH_2)_N-COOH \quad (I)$$

wherein n is 3 to 8;

(b) at least one 4,4'-dihydroxy-biphenyl having the general formula II

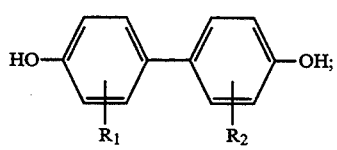

(c) at least one 4-hydroxy-benzoic acid having the general formula III

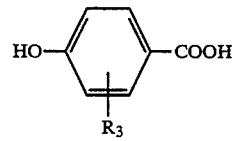

wherein $R_1$, $R_2$ and $R_3$ are independently hydrogen, a $C_1$-$C_6$alkyl, or a $C_3$-$C_6$-alkenyl, with the proviso that at least one from said three substituents is an alkenyl; with the following mutual molar ratios between the units;

(a)/(b)=1;

(c)/(a) =1 to 7, with the proviso that, if $R_3$ is hydrogen, the ratio of (c)/(a) is lower than, or equal to 2.

2. A thermotropic copolyester according to claim 1, wherein (a)/(b)=1 and (c)/(a) is 2 to 6 and wherein the mesophase nematic transition temperature range is 120° C. to 130° C.

3. A thermotropic copolyester according to claim 1, wherein the saturated alpha, omega-dicarboxy acid is selected from the group consisting of sebacic acid, suberic acid, and adipic acid.

4. A thermotropic copolyester according to claim 3, wherein said saturated alpha,omega-dicarboxy acid is sebacic acid.

5. A thermotropic copolyester according to claim 1, wherein the $R_1$, $R_2$ and $R_3$ substituents are, independently, hydrogen, methyl, propyl, or allyl.

6. A thermotropic copolyester according to claim 5, wherein the $R_1$ and $R_2$ and substituents are hydrogen, and the $R_3$ substituent is allyl or propyl.

7. A process for preparing a thermotropic copolyester according to claim 1, wherein a mixture of (a) a saturated aliphatic dicarboxylic acid, (b) a diacyl derivative of 4,4'-di-hydroxy-biphenyl and (c) an acyl-derivative of 4-hydroxy-benzoic acid is polycondensed in the molten state, at temperatures increasing from 190° C. up to a maximum value of about 320° C. and under pressures decreasing down to an end value of about $10^{-4}$ mm$_{Hg}$, in the presence of a catalyst which is a derivative of an alkali metal or an alkaline-earth metal or a metal oxide.

8. An elastomeric composition which contains a rubber and a thermotropic copolyester according to claim 1.

9. An elastomeric composition according to claim 8, which contains the thermotropic copolyester in an amount of from 2 to 50 parts per 100 parts of rubber.

10. An elastomeric composition according to claim 8, wherein the thermotropic polyester is present in an amount of from 5 to 40 parts per 100 parts of rubber.

11. A process according to claim 7, wherein the catalyst is sodium acetate.

12. An elastomeric composition which contains a rubber and a thermotropic copolyester according to claim 2.

* * * * *